United States Patent
Konopa et al.

(10) Patent No.: US 7,734,384 B2
(45) Date of Patent: Jun. 8, 2010

(54) TUNED BATTERY PACK DAMPER FOR A HYBRID ELECTRIC VEHICLE

(75) Inventors: Jason Konopa, Dearborn, MI (US); Floyd Cadwell, Dearborn, MI (US); David Ledger, Dearborn, MI (US); Jeffrey Boismier, Rockwood, MI (US); George Dolan, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 946 days.

(21) Appl. No.: 11/469,982

(22) Filed: Sep. 5, 2006

(65) Prior Publication Data

US 2008/0059012 A1 Mar. 6, 2008

(51) Int. Cl.
*F16F 15/00* (2006.01)
(52) U.S. Cl. .......................... 701/22; 429/96
(58) Field of Classification Search .................. 701/22; 180/68.5, 65.1, 65.6–65.8; 429/96; 248/500, 248/503
See application file for complete search history.

(56) References Cited

U.S. PATENT DOCUMENTS

| 3,927,728 | A | 12/1975 | Reime |
| 4,538,697 | A * | 9/1985 | Muroi et al. ............... 180/68.4 |
| 5,086,860 | A * | 2/1992 | Francis et al. .............. 180/68.5 |
| 5,534,364 | A | 7/1996 | Watanabe et al. |
| 5,558,949 | A | 9/1996 | Iwatsuki et al. |
| 6,227,322 | B1 | 5/2001 | Nishikawa |
| 6,230,833 | B1 * | 5/2001 | Setsuda ..................... 180/68.5 |
| 6,410,185 | B1 | 6/2002 | Takahashi et al. |
| 6,523,274 | B1 | 2/2003 | Saito et al. |
| 6,648,090 | B2 | 11/2003 | Iwase |
| 6,988,575 | B2 | 1/2006 | Takedomi et al. |
| 2001/0046624 | A1 | 11/2001 | Goto et al. |
| 2003/0070850 | A1 | 4/2003 | Reid et al. |

* cited by examiner

*Primary Examiner*—Dalena Tran
(74) *Attorney, Agent, or Firm*—David B. Kelley; Brooks Kushman P.C.

(57) ABSTRACT

A tuned mass damper system and vibration damper method for a hybrid electric road vehicle is disclosed. The vehicle has a powertrain with an engine, at least one electric machine and a battery. The battery mass forms a part of a vehicle vibration absorber that attenuates vibrations induced by road wheels of the vehicle.

10 Claims, 2 Drawing Sheets

TUNED BATTERY PACK DAMPER FOR A HYBRID ELECTRIC VEHICLE

BACKGROUND OF THE INVENTION

1. Field of the Invention

The invention relates to a hybrid electric vehicle with a high voltage battery having a mass that forms a part of a tuned vibration absorption system.

2. Background Discussion

A powertrain for a hybrid electric vehicle has two power sources. One source typically is an internal combustion engine and the second source is a high voltage battery. The battery acts as an energy storing device for a generator and a motor. In one possible configuration, the engine, the motor and the generator are mechanically coupled to a planetary gear set for coordinating power distribution from the engine and the battery. A vehicle system controller for a powertrain of that type will ensure that power management for optimum vehicle performance and drivability is maintained as it interfaces with a transmission control module to command a desired engine power and a desired battery power. Examples of a hybrid electric vehicle powertrain of this type are disclosed in U.S. Pat. No. 6,991,053 and U.S. Patent Publication US-2006/00224689, each of which is assigned to the assignee of the present invention.

Hybrid electric vehicles of this type, of necessity, require a large high voltage battery that has significant mass. It is current design practice to hard-mount the battery on the body of the vehicle. Battery mounting structures of this type typically have semi-rigid mounting elements. They are used to protect the battery from excessive vibrations transmitted to the vehicle body from the road through the vehicle body suspension.

One example of a prior art battery mounting technique may be seen by referring to U.S. Pat. No. 3,927,728, which discloses a hybrid electric vehicle having an electric motor and an electric storage battery that are rigidly mounted on a vehicle main frame. Main mount elements are used to stiffly and rigidly support heavy components of the hybrid drive system to avoid shock and vibrations by allowing the heavy components to resiliently move in a vertical direction while preventing movement in a horizontal direction. The sprung weight of the vehicle and the heavy components mounted to the vehicle do not develop a phase shift with respect to the unsprung weight of the vehicle.

U.S. Pat. No. 5,558,949 discloses a mounting technique for a hybrid electric vehicle battery wherein the battery is mounted in a battery box, which in turn is resiliently supported on a vehicle frame by mounting bars. The mounting bars in turn are insulated from the frame by a vibration absorbing flexible mounting strip. In this way, road vibrations are not transmitted directly to the battery through the battery box.

Batteries used in contemporary hybrid electric vehicle powertrains can weigh approximately 70-100 kilograms. Such installations, however, are not tuned to eliminate objectionable vehicle vibrations transmitted from the road wheels. The mass of the battery is not a part of an overall vehicle damper system.

SUMMARY OF THE INVENTION

The present invention uses the mass of the battery of the hybrid electric vehicle as part of a tuned mass damper system for the complete vehicle. The mass of the battery can be mounted on vibration isolators that can be tuned to dampen objectionable vehicle vibrations as part of an overall tuned vehicle vibration damper that takes into account the mass of the vehicle itself. Unlike conventional mounting structures for hybrid electric vehicle batteries, the mass of the battery used in the system and method of the present invention is not hard-mounted to the vehicle's body. It is capable of damping road vibrations by using tuned battery mass mounting isolators at spaced locations on the battery. In this way, the battery can serve two functions. First, it will function as a vibration suppression system for the vehicle; and, secondly, it will function as an energy storing device for the vehicle powertrain. The battery is mounted on the vehicle by tuned rubber-type supports that allow the battery mass to oscillate 180° out of phase with respect to vertical displacement of the vehicle mass.

When the vehicle wheels ride over an irregular road surface, vibrations of various input frequencies are developed, and resonance nodes of the vehicle wheels and suspension system can be excited. Two common types of resonances are referred to as "hop" and "tramp", which are in-phase and out-of-phase wheel modes, respectively. The "hop" and "tramp" resonances are low frequency vibrations with large amplitudes.

A known hybrid electric vehicle design, hereinafter described, uses a high-voltage hybrid electric vehicle battery that has the required mass for a tuned damper system to significantly reduce these kinds of road-induced vibrations. In addition, the tuned damper of the invention can be designed to minimize other vibration inputs, such as random or impulse forces with a square wave or triangular wave form. The damper system of the invention also can mitigate structural resonances in the vehicle, such as vehicle floor bending force resonances and rear vehicle body bending modes. Such structural resonances will depend upon the location of the battery in the vehicle. In the case of the known hybrid electric vehicle design previously mentioned, the battery is mounted on a vehicle cargo floor above the rear wheel suspension.

A primary mass of the tuned mass damper system and method of the invention is the vehicle mass. A secondary mass is the battery mass. A vehicle suspension system supports the vehicle mass, including the battery mass. The battery mass is supported on the vehicle mass by at least one tuned spring, the battery mass thereby acting as a tuned damper mass as force vibrations induced by the road wheels are attenuated.

An effective stiffness factor for the battery mass mounting spring is calculated using transformed equations of motion of the battery mass and the vehicle mass.

A mathematical model of the invention can express a response to vibration forces acting on the vehicle body, the wheels, the wheel suspension and the battery. The stiffness of the tuned vibration absorber system of the invention can be calculated so that its value is in the stiffness range for natural rubber.

PARTICULAR DESCRIPTION OF AN EMBODIMENT OF THE INVENTION

Figure 1:
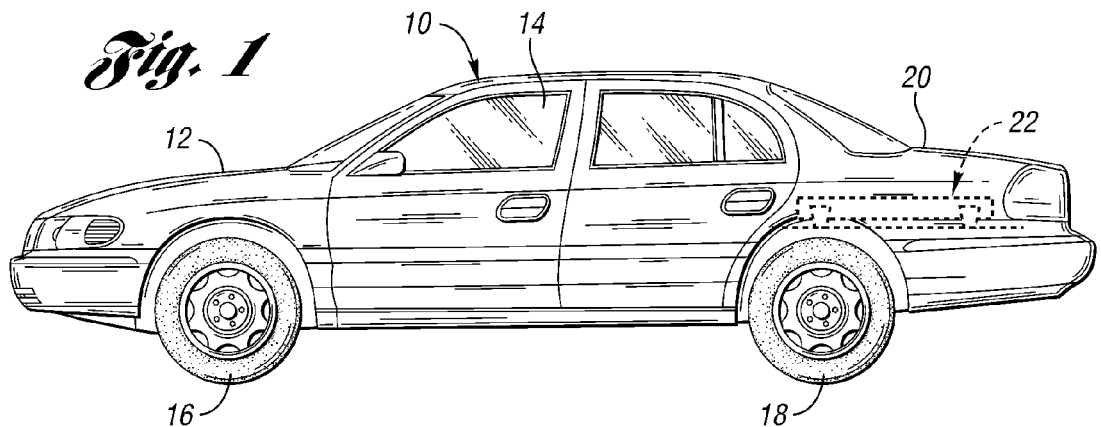
FIG. 1 is a side-elevation view of a contemporary hybrid electric vehicle manufactured by the assignee of the present invention, which may include the tuned vibration absorber system of the invention.

FIG. 1 shows at 10 a hybrid electric vehicle of known design. It includes a forward powertrain compartment 12, a passenger compartment 14, forward traction wheels 16, and rearward traction wheels 18. It also includes a rearward cargo carrying area 20.

Traction wheels 16 and 18 are supported on a vehicle frame, not visible in FIG. 1, by front and rear traction wheel suspension systems, which will be described with respect to FIG. 2. The mass of the vehicle is supported on the vehicle frame, whereby the vehicle body, the vehicle frame and vehicle passenger compartment structure form an overall vehicle mass, which will be considered to be separate and independent from the battery mass.

The hybrid electric vehicle battery is mounted on a cargo carrying area platform at the rear of the vehicle, as shown at 22. In other vehicle configurations, the battery mass could be located at other locations in the vehicle; but for purposes of an explanation of the present invention, it will be assumed that the battery mass is located as shown in FIG. 1.

Figure 2:
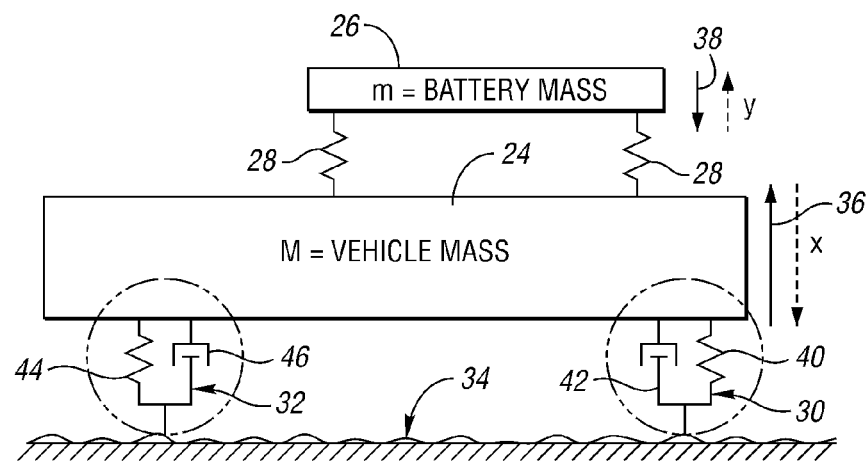
FIG. 2 is a schematic representation of a hybrid electric vehicle battery acting as a tuned damper mass in accordance with the invention.

In FIG. 2, the vehicle mass, schematically designated by reference numeral 24, is indicated to be a vehicle mass "M". The hybrid electric vehicle battery, schematically shown at 26, is identified as a battery mass "m". The mass "m" is supported on the large mass of the vehicle by battery mass mounts modeled as suspension springs 28 at selected locations on the battery. The vehicle suspension for the rear wheels is shown at 30 and the vehicle suspension for the front wheels is shown at 32. The road surface is indicated at 34.

Irregularities of the road surface 34 are shown. For purposes of the present analysis, it will be assumed that the road surface will provide sinusoidal inputs to the suspension system, as will be explained with reference to FIG. 3.

Irregularities of the road surface will cause vertical forces to be transmitted through suspension 30 and suspension 32 in the direction indicated by vector 36 in FIG. 2. This will be referred to hereinafter as the vertical direction "x".

The resilient suspension of the battery mass "m" on the vehicle mass "M" will move in a vertical direction, as indicated by vector 38. This will be referred to in the present analysis as the "y" direction.

As seen in FIG. 2, the suspension 30 includes a suspension spring 40 and a damper 42 disposed in parallel relationship. Likewise, suspension 32 includes parallel spring 44 and damper 46. The suspension for the battery mass on the vehicle mass includes only springs 28, as indicated previously, since damping is considered to be negligible for ease of analysis.

Figure 3:
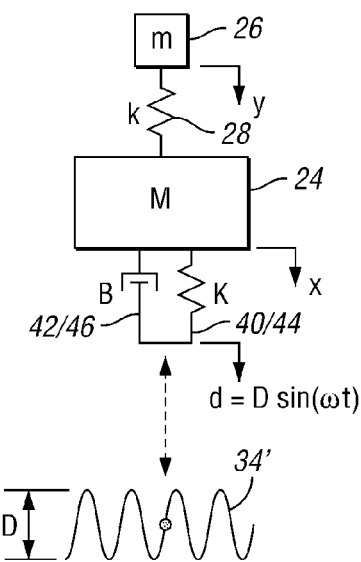
FIG. 3 is a representation of a tuned damper system for a hybrid electric vehicle in which the mass of the battery forms a part of a damper system in accordance with the invention.

FIG. 3 shows a model of the damper system of the invention. The displacement of the vehicle wheels is indicated in FIG. 3 by the symbol "d". The road input displacement amplitude, due to the surface profile 36, is indicated in FIG. 3 at "D". For purposes of this analysis, as mentioned above, the road input displacement "d" will be assumed to be sinusoidal, as indicated at 34'. Thus, a relationship of "d" to "D" can be expressed by the equation:

$$d = D \sin \omega t$$

where:

"$\omega$"=frequency and "t"=the time period for a given wave form. Although the wave form indicated in FIG. 3 is sinusoidal, any other wave form could be used as well in an explanation of the invention.

The tuned battery mounts allow the battery mass to oscillate in an out of phase relationship with respect to the vehicle mass. This phase relationship can easily be measured with accelerometers located on the battery mass, the vehicle mass and the suspension system, together with a conventional FFT analyzer.

Figure 4:
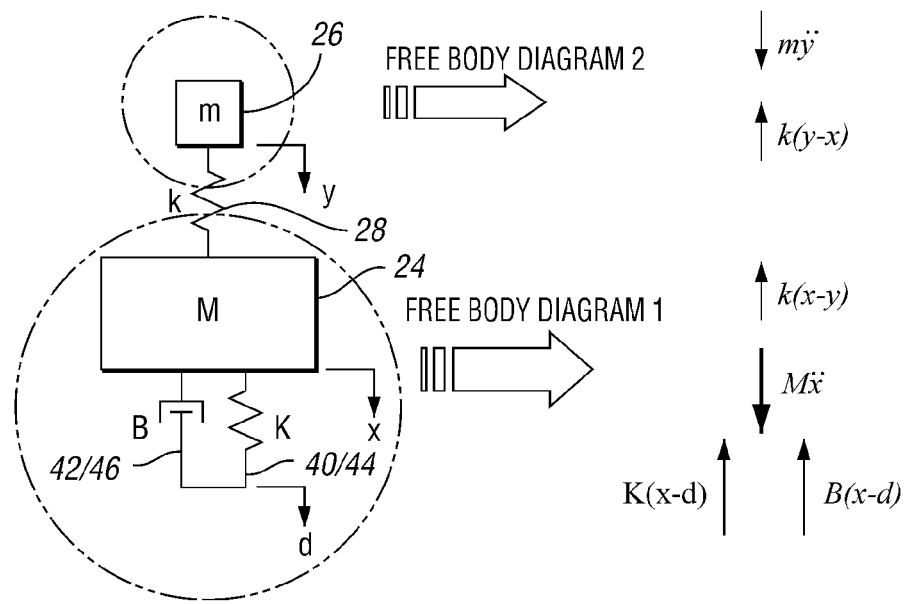
FIG. 4 is a schematic representation of a portion of the system of FIG. 3, which includes free body diagrams of forces used in the equations of motion that are characteristic of the damper system of the invention.

In FIG. 4, the mass of the battery is shown in free body diagram No. 2 and the vehicle mass and suspension are shown in free body diagram No. 1. In the case of free body diagram No. 1, the equations of motion require a summation of forces indicated in free body diagram No. 1. This is demonstrated as follows:

$$\Sigma F = ma, \quad (1)$$

$$K(x-d) + B(\dot{x}-\dot{d}) + k(x-y) = -M\ddot{x}, \quad (2)$$

$$M\ddot{x} + K(x-d) + B(\dot{x}-\dot{d}) + k(x-y) = 0, \quad (3)$$

$$M\ddot{x} + Kx - Kd + B\dot{x} - B\dot{d} + kx - ky = 0, \text{ and} \quad (4)$$

$$M\ddot{x} + Kx + B\dot{x} + kx - ky = Kd + B\dot{d}. \quad (5)$$

To transform equation (5) from a time domain to a frequency domain, a Laplace transform technique is used.

The theory of the Laplace transformation makes use of a number of rules and methods that are significant in an analysis of this type. For example, if a function F(t) is defined for all positive values of a variable, and t then is multiplied by $e^{-st}$ and integrated with respect to t from 0 to infinity, a new function F(s) of the variable s is obtained; i.e., $$\int_0^\infty e^{-st} F(t) dt = f(s).$$

This operation on a function F(t) is the Laplace transformation of F(t). When the Laplace transform technique is applied to the equation of motion (5), the following equation results:

$$(Ms^2 + K + Bs + k)X(s) - kY(s) = (K + Bs)D(s). \quad (6)$$

The summation of forces from free body diagram "2" of FIG. 4 is expressed as follows:

$$\Sigma F = ma, \quad (7)$$

$$k(y-x) = -m\ddot{y}, \quad (8)$$

$$m\ddot{y} + k(y-x) = 0, \text{ and} \quad (9)$$

$$m\ddot{y} + ky - kx = 0. \quad (10)$$

The force acting on the free body diagram "1" of FIG. 4 is expressed in equation (8), where "y" is the displacement of the free body mass "m" and the second differential of the displacement, or acceleration, of the mass is $\ddot{y}$. Equations (9) and (10) are derived from equation (8). When the Laplace transformation technique is applied to equation (10), the result is as follows:

$$(ms^2 + k)Y(s) - kX(s) = 0, \text{ and} \quad (11)$$

$$Y(s) = \frac{kX(s)}{ms^2 + k}. \quad (12)$$

Equations (6) and (12) represent the transformation of the equations of motion from the time domain to the frequency domain for masses "M" and "m", respectively, where "s" is defined as follows:

$$s = j\omega = \omega\sqrt{-1}., \text{ an imaginary number.}$$

Equations of motion following the application of the Laplace transform technique then are expressed as follows for the summation of the forces in free body diagram 1 and free body diagram 2:

$$(Ms^2 + K + Bs + k)X(s) - k\frac{kX(s)}{ms^2 + k} = (K + Bs)D(s), \quad (13)$$

$$\left\{(Ms^2 + Bs + K = k) - \frac{k^2}{ms^2 + k}\right\}X(s) = (K + Bs)D(s), \quad (14)$$

$$\frac{X(s)}{D(s)} = \left[\frac{(K + Bs)(ms^2 + k)}{(ms^2 + k)(Ms^2 + Bs + K + k) - k^2}\right], \text{ and} \quad (15)$$

$$\frac{X(j\omega)}{D(j\omega)} = \left[\frac{(K + Bj\omega)(-m\omega^2 + k)}{(-m\omega^2 + k)(-M\omega^2 + Bj\omega + K + k) - k^2}\right], \quad (16)$$

where Y(s), developed in equation (12), is substituted in equation (13) and the value $(K+B_s)D(s)$ is carried over from equation (6) to equation (13).

An example of the foregoing calculations for the model of FIG. 3 assumes that all input motion is in a vertical direction at the vehicle tire and wheel assembly. The weight of the battery is divided by the number of supports for tuned battery mounts. From equation (16), the value "k", the battery mount stiffness, can be calculated based on a known battery design mass "m" and desired frequency ω to minimize vibration in the vehicle. At that step, ω=0. Stiffness k is set equal to mω², so the numerator of equation (16) will approach zero, thus minimizing vehicle displacement x.

A summary of the terms and variables used in the foregoing analysis is as follows:

B=vehicle suspension damping (force/velocity),
d=displacement input at the vehicle wheels,
k=hybrid battery mount stiffness, (force/disp.),
K=vehicle suspension stiffness,
m=hybrid battery mass,
M=vehicle mass,
x=displacement output of vehicle body,
y=displacement of hybrid battery, and
ω=frequency.

Figure 5:
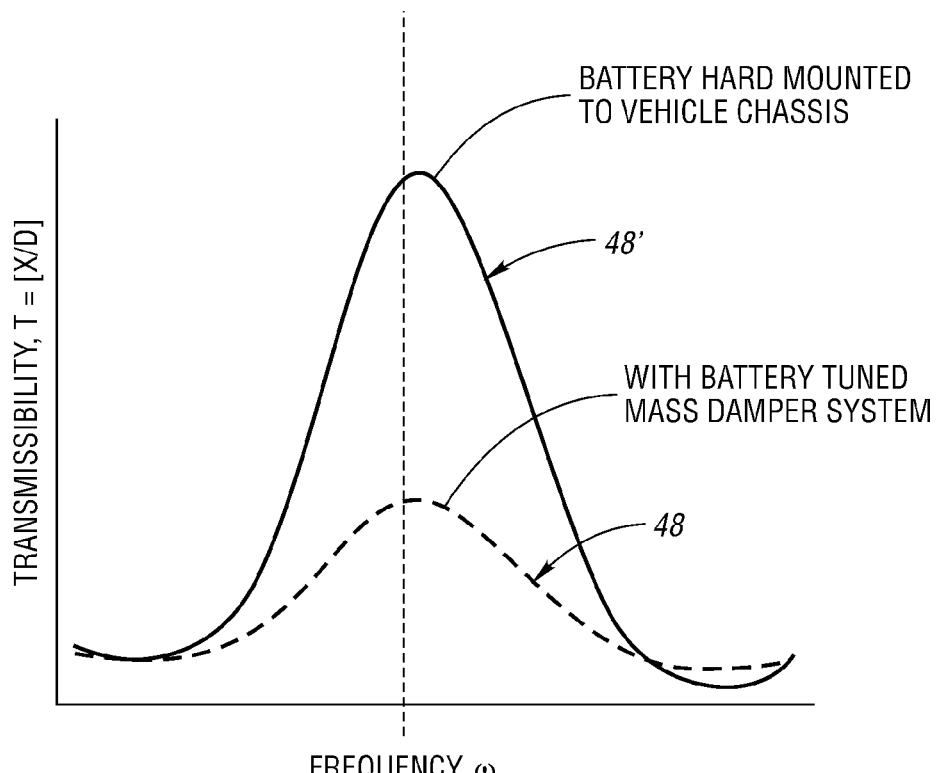
FIG. 5 is a schematic plot of frequency and force transmissibility showing the vibration amplitude reduction of the tuned mass damper characteristic of the invention in comparison to a hard-mounted battery of the type used in conventional hybrid electric vehicles.

FIG. 5 shows the improvement in transmissibility of forces transmitted from the road to the vehicle. The transmissibility of a conventional hybrid electric vehicle with fixed battery mass mounts is shown at 48'. The improved wave form developed by the invention is shown at 48. The term "transmissiblity" is defined as T=output or displacement of the vehicle body divided by input or road displacement at the wheels.

Although an embodiment of the invention is disclosed, it will be apparent to persons skilled in the art that modifications may be made without departing from the scope of the invention. All such modifications and equivalents thereof are intended to be covered by the following claims.

What is claimed:

1. A tuned mass damper system for a hybrid electric road vehicle having road wheels and a powertrain with an engine, at least one motor-generator and a battery, the battery being a source of driving power and an electric energy storage medium, the damper system comprising:
    a primary damper mass comprising the mass of the vehicle including mass of a vehicle body;
    a secondary damper mass comprising the mass of the battery;
    the secondary damper mass being spring-mounted on the primary damper mass;
    the primary damper mass being substantially greater than the secondary damper mass, the primary damper mass and the secondary damper mass being in substantial vertical alignment and vertical motion of the secondary mass being out of phase with respect to the motion of the primary mass;
    a vehicle suspension system located between the vehicle wheels and the vehicle mass, the suspension system supporting the vehicle mass;
    the vehicle suspension system comprising at least one spring and at least one vibration damper acting in parallel relationship; and
    at least one battery mounting spring between the battery mass and the vehicle mass and supporting the battery whereby the battery mass functions as a tuned damper mass as forced vibrations induced by road irregularities are attenuated as they are transmitted through the vehicle suspension system to the vehicle mass by the road wheels.

2. The tuned mass damper system for a hybrid electric road vehicle set forth in claim 1 wherein the battery mass is supported on the vehicle mass by multiple battery mounting springs at selected locations on the battery mass.

3. The tuned mass damper system for a hybrid electric road vehicle set forth in claim 1 wherein the road vehicle has front road engaging wheels and rear road engaging wheels;
    the vehicle suspension system including separate spring and vibration damper subassemblies at the front road engaging wheels and the rear road engaging wheels.

4. A method for attenuating vibrations induced by vehicle road wheel forces that act on a hybrid electric road vehicle, the vehicle having a powertrain that includes an engine, an electric machine and a battery electrically coupled to the electric machine;
    mounting the mass of the vehicle on vehicle road wheels with at least one suspension spring and damper assembly;
    mounting the mass of the battery on the vehicle mass with at least one tuned mounting element;
    calculating simplified equations of motion of the mass of the vehicle and the mass of the battery;
    transforming the equation of motion of the mass of the vehicle from a time domain to a frequency domain;
    transforming the equation of motion of the mass of the battery from a time domain to a frequency domain;
    combining the transformed equations of motion of the vehicle mass and the battery mass; and
    calculating an effective stiffness factor for the mounting spring for the mass of the battery using the combined transformed equations of motion.

5. The method set forth in claim 4 wherein the steps for transforming the equations of motion for the mass of the vehicle and the mass of the battery comprise developing a Laplace transform for each of the equations of motion.

6. The method set forth in claim 5 wherein the Laplace transforms for the equations of motion of the vehicle mass and the battery mass are:

$$(Ms^2 + K + Bs + k)x(s) - kY(s) = (K + Bs)D(s), \text{ and}$$

$$Y(s) = kX(s)/(ms^2 + k),$$

where:
 s=jω,
 ω=frequency,
 j=$\sqrt{-1}$, an imaginary number,
 M=vehicle mass,
 D=vehicle mass displacement, and
 Y=displacement of battery mass.

7. The method set forth in claim 4 wherein the simplified equation of motion of the vehicle mass is:

$$M\ddot{x} + Kx + B\dot{x} + kx - ky = Kd + B\dot{d},$$

where:
 B=vehicle suspension damping, (force/velocity),
 d=displacement input at the vehicle wheels,
 k=hybrid battery mount stiffness, (force/displ.)=mω² where ω=frequency,
 K=vehicle suspension stiffness (force/displ.),
 m=hybrid battery mass,
 M=vehicle mass,
 x=displacement output of vehicle body, and
 y=displacement of hybrid battery.

8. The method set forth in claim 7 wherein:
the equation of motion of the battery mass is $$m\ddot{y} + ky - kx = 0.$$

where:
 k=hybrid battery mount stiffness, (force/displ.),
 m=hybrid battery mass,
 x=displacement output of vehicle body, and
 y=displacement of hybrid battery.

9. The method set forth in claim 8 wherein a spring stiffness for the battery mass mounting spring is calculated by combining the transformed equations of motion of the vehicle mass and the battery mass in accordance with the equation:

$$\frac{X(j\omega)}{D(j\omega)} = \left[\frac{(K + Bj\omega)(-m\omega^2 + k)}{(-m\omega^2 + k)(-M\omega^2 + Bj\omega + K + k) - k^2}\right]; \text{ and}$$

computing a stiffness factor for the battery mass mounting spring by setting the term $(-m\omega^2+k)$ equal to zero in the combined transformed equations whereby the amplitude of vibrations discernable in the vehicle are minimized where:
 s=jω,
 ω=frequency, and
 j=$\sqrt{-1}$, an imaginary number.

10. The method set forth in claim 4 wherein the equation of motion of the battery mass is $$m\ddot{y} + ky - kx = 0,$$

where:
 k=hybrid battery mount stiffness, (force/displ.),
 m=hybrid battery mass,
 x=displacement output of vehicle body, and
 y=displacement of hybrid battery.

* * * * *